US010521449B1

(12) United States Patent
Schwartz et al.

(10) Patent No.: US 10,521,449 B1
(45) Date of Patent: Dec. 31, 2019

(54) CROSS-REGION REPLICATION ARCHITECTURE

(71) Applicant: Amazon Technologies, Inc., Seattle, WA (US)

(72) Inventors: Benjamin Aldouby Schwartz, East Palo Alto, CA (US); Khawaja Salman Shams, Seattle, WA (US); Usman Ahmed Shami, Sammamish, WA (US); David Craig Yanacek, Seattle, WA (US); Khai Quang Tran, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 14/573,956

(22) Filed: Dec. 17, 2014

(51) Int. Cl.
*G06F 17/30* (2006.01)
*G06F 16/27* (2019.01)
*H04L 29/08* (2006.01)

(52) U.S. Cl.
CPC .......... *G06F 16/27* (2019.01); *H04L 67/1095* (2013.01)

(58) Field of Classification Search
CPC ......... G06F 17/30011; G06F 17/30575; G06F 17/30581; G06F 11/1469; G06F 11/1492; G06F 17/30241; G06F 17/30345; G06F 17/30353; G06F 16/27; H04L 67/1095
USPC ........ 707/610, 625, 628, 631, 638, 802, 803
See application file for complete search history.

(56) References Cited

U.S. PATENT DOCUMENTS

| | | | | |
|---|---|---|---|---|
| 8,688,958 B2* | 4/2014 | Nomoto | ............... | G06F 9/52 712/17 |
| 9,641,488 B2* | 5/2017 | Mityagin | ............ | H04L 63/0428 |
| 2007/0208818 A1* | 9/2007 | Manders | ............ | H04L 67/1095 709/208 |
| 2009/0282125 A1* | 11/2009 | Jeide | ............... | H04L 67/1095 709/217 |
| 2009/0327358 A1* | 12/2009 | Lukiyanov | ........ | G06F 17/30038 |
| 2011/0040895 A1* | 2/2011 | Griffin | ............... | H04L 67/1095 709/248 |
| 2012/0131120 A1* | 5/2012 | Maghraby | .............. | H04H 60/40 709/206 |
| 2013/0185532 A1* | 7/2013 | Flynn | ............... | G06F 3/061 711/162 |

(Continued)

OTHER PUBLICATIONS

Qian et al., Research on a Method of Using Whole Sort Timestamp Vector Method in Massive Data Update Conflicts, Year: 2012, 2012 Second International Conference on Business Computing and Global Informatization.*

(Continued)

*Primary Examiner* — Greta L Robinson
(74) *Attorney, Agent, or Firm* — Davis Wright Tremaine LLP (57) ABSTRACT

One or more computing nodes located in a first region may maintain a first collection of data items. A second set of one or more computing nodes in a second region may maintain a collection of data items that is at least a partial replica of the first collection. Notifications of changes to the first collection may be transmitted, via a broadcast communications channel, to a replication module, which may be included in a client application. The replication module may transmit requests to update the second collection of data based on changes to the first collection. Conflicts may be resolved through a last-write wins policy.

20 Claims, 8 Drawing Sheets

(56) References Cited

U.S. PATENT DOCUMENTS

| | | | |
|---|---|---|---|
| 2013/0339643 A1* | 12/2013 | Tekade | G06F 17/30581 |
| | | | 711/162 |
| 2014/0032565 A1* | 1/2014 | Parker | G06F 17/30056 |
| | | | 707/741 |
| 2015/0128152 A1* | 5/2015 | Lachaume | G06F 9/465 |
| | | | 719/316 |
| 2015/0163206 A1* | 6/2015 | McCarthy | G06F 21/6227 |
| | | | 713/171 |
| 2015/0199395 A1* | 7/2015 | Greenstein | G06F 17/30292 |
| | | | 707/611 |
| 2015/0199415 A1* | 7/2015 | Bourbonnais | G06F 17/30578 |
| | | | 707/615 |
| 2015/0207823 A1* | 7/2015 | Mahbod | H04L 47/10 |
| | | | 709/228 |
| 2016/0238398 A1* | 8/2016 | Hu | G01C 21/00 |

OTHER PUBLICATIONS

Jan Lindstrom et al., Dynamic Adjustment of Seialization Order using Time-Stamp Intervals in Real-Time Databases, Real-Time Computing Systems and Applications, RTCSA '99, Sixth International Conference, pp. 13-20 (Year: 1999).*

Nicole Dunlop et al., Dynamic Conflict Detection in Policy-Based Management Systems, Proceedings. Sixth International Enterprise Distributed Object Computing, pp. 15-26 (Year: 2002).*

\* cited by examiner

CROSS-REGION REPLICATION ARCHITECTURE

BACKGROUND

Databases maintained in a data center in one geographic location may sometimes be replicated to facilities in other geographic locations. Typically, the data is stored in a primary database in one geographic region, and replicated to a database in another region. This is typically done to provide a backup copy in the event that a power failure or other event disrupts access to the primary database. Conventional replication techniques may involve mirroring the primary database on the secondary database using a technique such as log shipping, in which all operations applied to the primary database are also applied to the secondary database. This technique is generally controlled by the database administrator.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems and methods for replicating data between collections of data maintained in separate geographic regions. For example, a distributed key-value database system may be maintained in a data center in a first geographic region. A table or other collection of data items may be stored in the first region. For various reasons, such as improving the availability or accessibility of the data, some or all of the data might be replicated to another geographic region.

A client-based architecture for performing replication may allow for improved control and customization of the replication process based on the particular needs of a given application. The client-based architecture for performing replication may be based on a broadcast communications channel over which notifications of changes to data items stored in the collections are broadcast. A client process may subscribe to notifications of changes made to a collection maintained in a first geographic region, and transmit requests to a second geographic region, corresponding to an item collection maintained in another geographic region. Conflict resolution rules are applied to resolve conflicts between corresponding versions of data items in different regions. In some instances, a last-write wins policy is employed. The client may supply information that is indicative of the policy to be applied. Deleted items are maintained, subsequent to their deletion, in an item collection in order to support the last-write wins conflict resolution policy.

Database management systems of various types, including relational databases, key-value pair databases, and so on, may maintain collections of data items. One example of a collection of data items is a table. Another is a collection of key-value pairs, including collections in which a key is mapped to multiple values. These examples are intended to be illustrative, and should not be viewed as limiting the scope of the present disclosure.

A data item may refer to entities within the collection such as the rows of a table or a set comprising a key value and one or more other values that are mapped to the key. Data items within a collection are, typically, uniquely identified by a key value. In some cases, multiple values may be combined to form a compound key. As used herein, the term key can, where appropriate, encompass both single value keys and compounds keys. A key or compound key that uniquely identifies a data item may be referred to herein as a primary key, or as a key.

The term replica, as used herein, can include copies of data propagated from one collection of data to another collection. In various instances, a replica of a collection of data may take a different form than the source collection. Various transformations may also be applied to a replica, and the replica need not be complete. For example, a replica of a collection of product catalog information might be made. In the process of replicating the catalog to a second region, the currency values in the catalog might be converted from dollars to euros. In addition, it could be the case that the embodiment only causes a subset of data (for example, products sold in Europe) to be replicated to the second collection. It could also be the case that the data is migrated from one type of system to another, such as from a distributed database management system to a single file repository suitable for use on a single computing device. The replication process may also be applied to the construction of indexes, or used for archival purposes.

In one example of a client-based architecture for replicating data between regions, a system may comprise a first one or more computing nodes that, upon processing a first update of a data item stored in a first collection of data items, transmits a notification of an update to a data item over a broadcast communications channel. The first one or more computing nodes may be located in a first geographic region. The notification is transmitted after determining that the update originated from a client request to update the data item, rather than having been originated as part of the replication process.

A second one or more computing nodes may be located in a second region. When activated, the second one or more computing nodes maintain a second collection of data items that is configured as an at least partial replica of the first collection.

The system may further comprise one or more memories with computer-executable instructions that, upon execution, cause a client-side replication module to receive the notification of the first update from the broadcast communications channel. The client-side replication module then transmits a request to update the data item in the second collection. The request comprises the information included in the first update, such as the fields or columns being modified, and the new values for the fields or columns. The request may also include a sequence indicator, such as a timestamp or a monotonically increasing integer. When received by the second one or more computing nodes, the request is processed if it is determined that it does not conflict with a prior update to the data item. The determination is based at least in part on the sequence indicator included in the request indicating that the request originated after the time of any prior updates to the item in the second collection.

Figure 1:
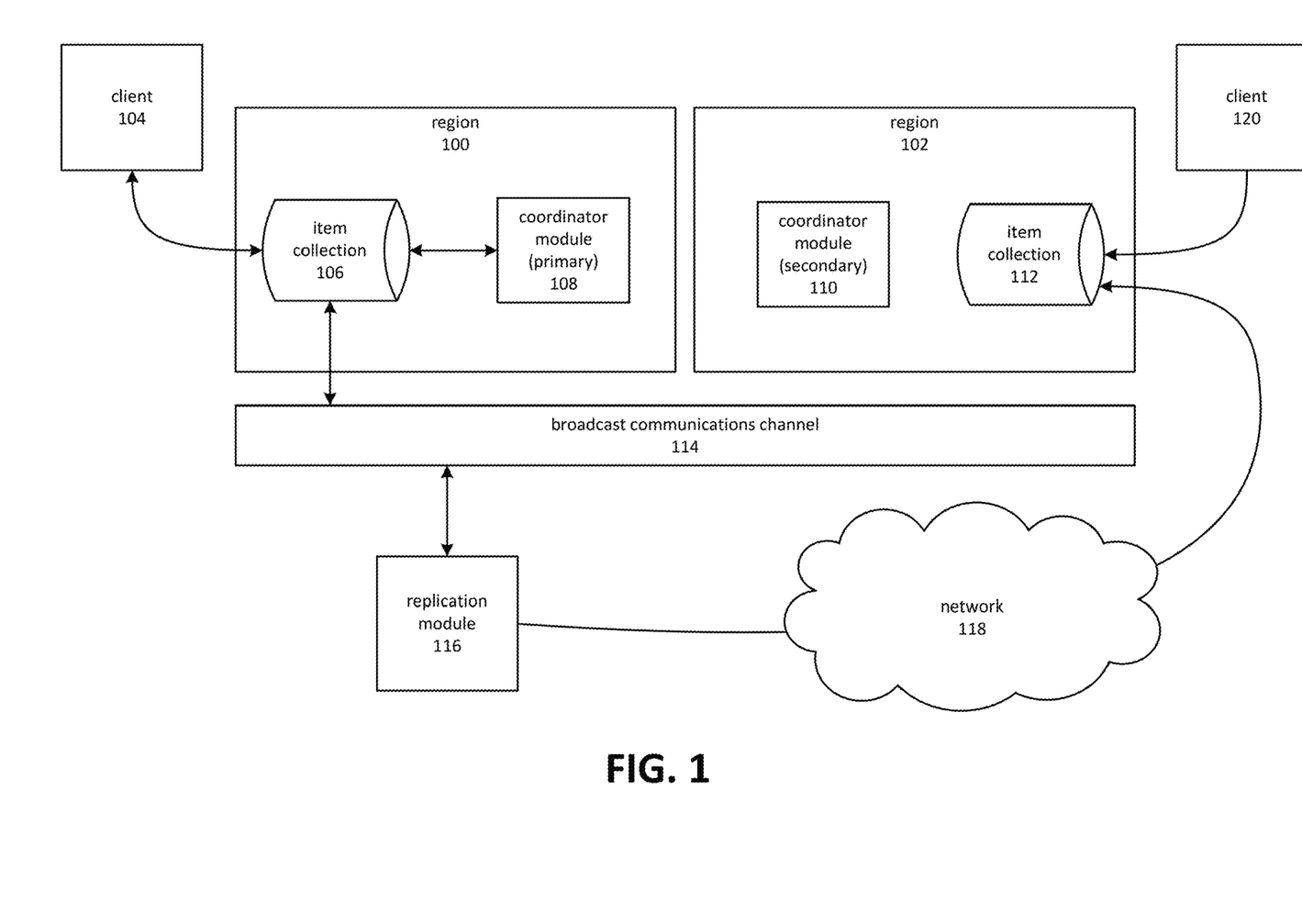
FIG. 1 is a block diagram depicting an example of a system for synchronizing item collections maintained in separate regions.

FIG. 1 is a block diagram depicting an example of a system for synchronizing item collections maintained in separate regions. A region, such as the regions 100 and 102 that are depicted by FIG. 1, can refer to computing nodes operating in a distinct geographic region. For example, region 100 might refer to a collection of computing nodes operating in New York, and region 102 to a collection of computing nodes operating in Seattle. Regions 100 and 102 might be geographically separated for a variety of reasons, such as improving the availability and reliability of a collection of data. In the event of a failure in one region—such as a power outage—a copy of the data maintained in the other region might be used to provide access to the collection until power can be restored. Another reason is that the speed of access to data in the collection can be improved by allowing the data to be accessed through the region that is closest to the client. For example, a client in San Francisco might be able to access data maintained in Seattle more quickly than the data maintained in New York. On the other hand, if the client should relocate to Philadelphia, it might be able to access the data in New York more quickly than the data in Seattle.

In FIG. 1, item collection 106 in region 100 might represent a collection of data, such as a relational database table or a collection of key-value pairs, which is maintained on one or more computing nodes. Techniques such as partitioning may be employed within a region for various reasons, such as improving performance and capacity scaling. Accordingly, item collection 106 in region 100 can be maintained on a first plurality of computing nodes. Similarly, item collection 112 in region 102 can be maintained on a second plurality of computing nodes.

Item collection 112 may be maintained as at least a partial replica of item collection 106. The item collections 106 and 112 may correspond to the same table or other logical entity, i.e., they may represent the same logical collection of data, share the same schema (where applicable, e.g., for relational database tables), and so on. The item collections 106 and 112 may also be at least partial replicas of each other. In some instances, the item collections 106 and 112 may be maintained so that they each share the same set of data, with relatively small lag between the two collections. In other instances, smaller subsets of the collections might be maintained between them. For example, data used by a particular client device might generally be maintained in region 102, but be temporarily replicated to region 100 while the client device is operating in a different geographic region. When the client device has been returned to its original location, replication to region 100 might be suspended.

Communication between regions may occur through network 118, which can include various communications mechanisms, such as the Internet, private networks, and so on. For various reasons, such as the distance involved, competition for network bandwidth, and so forth, communication between region 100 and region 102 may have relatively high latency, as compared to communication between the computing nodes operating within a given region. Conventional approaches to synchronizing data collections, such as log sharing, may be suboptimal for this reason.

Client 104 may transmit various requests to perform operations on item collection 106. The term client may refer to a computer-executing process operating on a computing node, including personal computers, servers, mobile phones, smart devices, a virtual machine executing on a computing device, and so on.

The operations transmitted by client 104 may include requests to insert, read, update, and delete items stored in item collection 106. In some instances, these operations may be requested by the transmission of data specifying get and set operations, or by transmitting data containing structured query language ("SQL") statements in other instances. Client 120 may transmit similar requests to item collection 112 in region 102.

Notifications concerning changes to item collection 106 may be transmitted over a broadcast communications channel 114 to a replication module 116. Replication module 116 may determine to propagate the change to region 102, via network 118. Because client 120 may also be updating item collection 112, there exists the possibility of conflicts between changes to item collection 112 performed at the request of client 120 and those performed at the request of replication module 116.

As noted, notifications concerning changes to item collection 106 may be transmitted over a broadcast communications channel 114, which can consist of a subscription-based multicast data transmission mechanism. The mechanism may be implemented in part using networks such as the Internet, local area networks, and so forth. In addition, broadcast communications channel 114 may include facilities for fulfilling subscriptions to notifications transmitted over the channel. The broadcast communications channel 114 may provide notifications to subscribers in region 100, region 102, or another location (not shown). The broadcast communications channel 114 can operate using a publish and subscribe model in which the publisher (i.e., the transmitter of information over the channel) is not aware of any particular subscriber to the information. There may, in addition, be multiple subscribers to the same set of information.

A coordinator module 108 may operate in region 100. The coordinator module 108 may perform operations including initiating a worker process (not shown in FIG. 1) within region 100 to identify changes to item collection 106, and transmit information describing those changes over broadcast communications channel 114 to replication module 116 via a publish and subscribe model. In other words, the worker process that transmits information about changes to item collection 106 may not necessarily be aware of the existence or operation of replication module 116.

As used herein, the term module may refer to one or more assemblies of computer-executable instructions, such as executable files, libraries, data files, and so forth, possibly combined with specialized and general-purpose hardware, that performs the operations and/or fulfills the purpose of the module as described herein.

In the example of FIG. 1, a second coordinator module 110 is also depicted. The coordinator modules 108 and 110 may operate in a primary/secondary configuration in which, should primary coordinator module 108 fail, secondary coordinator module 110 may take its place. Accordingly, both coordinator modules 108 and 110 may be able to operate across regions. For example, should coordinator module 108 fail, coordinator module 110 might assume responsibility for the operation of the worker process operating in region 100.

Replication module 116 subscribes to the notifications transmitted over broadcast communications channel 114 that concern changes to item collection 106. Upon receipt of the notification, replication module 116 may transmit a request to perform a corresponding change to item collection 112. The request may be transmitted over network 118 to the one or more computing nodes in region 102, which maintains item collection 112.

Replication module 116 may operate in region 100, region 102, or another location. In some instances, replication module 116 may be a client-side application programming interface ("API") which can be included in a client application. In some instances, this could include client 104 or client 120, or another client application. A client application can include applications run in a hosted environment within a region, such as regions 100 or 102. In other instances, a client application can run outside of a hosted environment, and may connect to elements depicted in FIG. 1 by a network such as the Internet.

As noted, conflicts may occur between changes initiated by client 104 and changes initiated by client 120. The data items stored in item collection 106 and item collection 112 can include a sequence indicator of the last update time. When replication module 116 issues a request to update a data item in item collection 112—in response to a change to item collection 106—the request may also include a sequence indicator corresponding to the time the data item was updated in item collection 106. Various conflict resolution rules may be applied based on the sequence indicator. In some instances, whichever event occurred later takes priority.

In order to resolve conflicts involving delete operations, deleted rows are not removed from item collections 106 and 112. Instead, requests to delete a data item are processed by marking the data item as deleted and updating the corresponding record to include a sequence indicator indicative of the time of deletion. When an update to a data item in item collection 106 is received as a request to update the corresponding item in item collection 112, but that item has been marked as deleted in item collection 112, the conflict may be resolved by restoring the item per the update request when the update request occurred after the delete.

Figure 2:
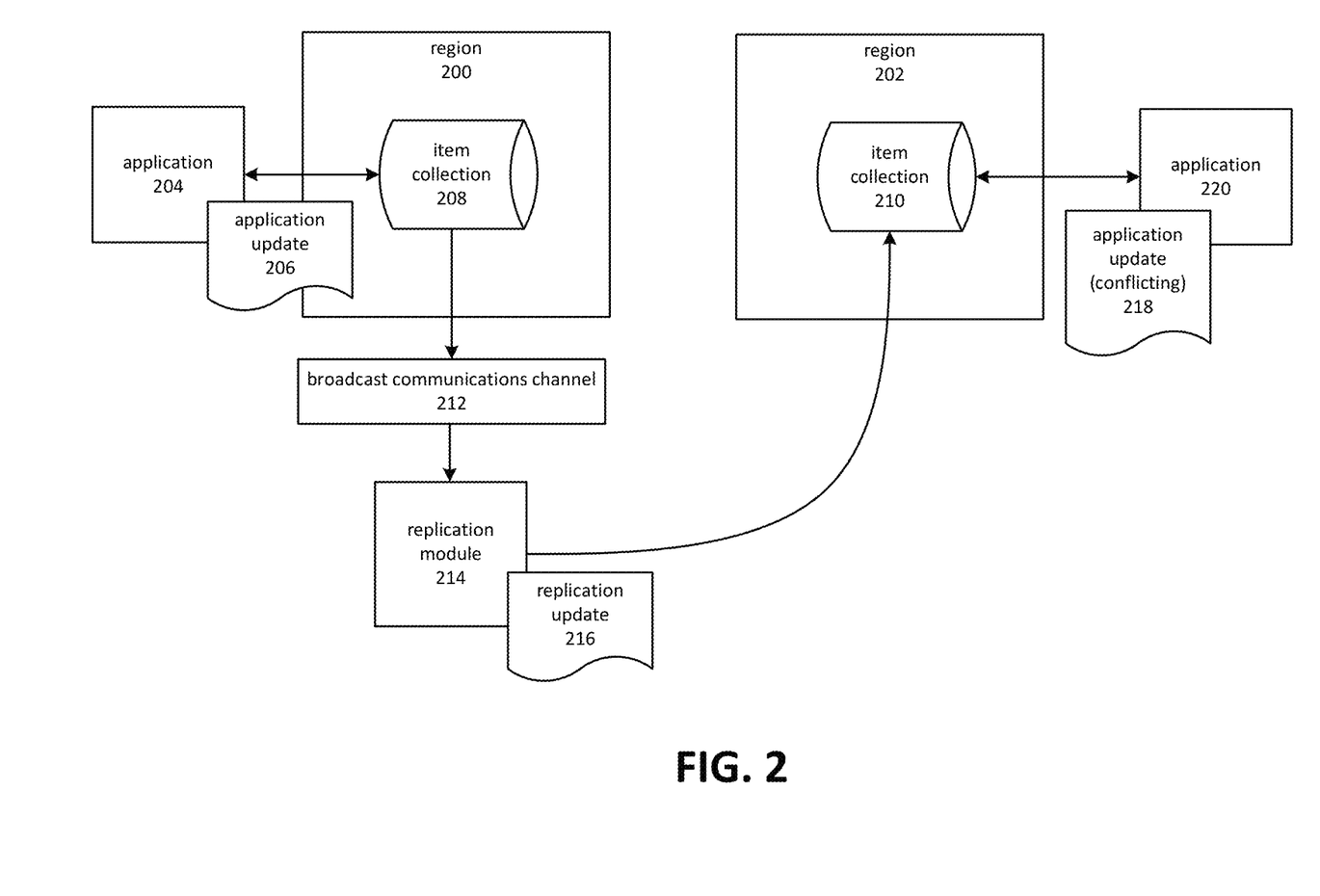
FIG. 2 is a block diagram depicting further aspects of a system for synchronizing item collections maintained in separate regions.

FIG. 2 is a block diagram depicting further aspects of a system for synchronizing item collections maintained in separate regions. The system may comprise at least the two depicted regions 200 and 202. In region 200, a first plurality of computing nodes may maintain an item collection 208. An application 204 may transmit requests to modify item collection 208, for example by inserting, updating, or deleting items stored in the collection. FIG. 2 depicts an example of a request to update a data item in item collection 208, the request having been issued by application 204.

In region 202, a second plurality of computing nodes may maintain an item collection 210. Application 220 may transmit requests to insert, update, or delete items in item collection 210. For example, application 220 may transmit a request to update a data item in item collection 210. In FIG. 2, this request is depicted by application update 218. For the purpose of providing an example on a conflict resolution technique, it may be assumed that application update 218 is a request to update a data item in item collection 210 that corresponds to the same item in item collection 208. An item stored in item collection 208 may be said to correspond to an item in item collection 210 when the two items have the same primary key. Because application update 206 and application update 218 correspond to the same primary key for the purpose of this example, a conflict between the two application updates 206 and 218 exists and is to be resolved when replication of the item between the two item collections 208 and 210 occurs.

In the example of FIG. 2, a replication module 214 receives a notification message comprising information indicative of the application update 206. The notification message is received via broadcast communications channel 212. The replication module 214 may then form a replication update 216 and transmit the replication update to item collection 210 in region 202. The replication update 216 may correspond to application update 206, in that it comprises instructions for updating the version of the data item in item collection 210 to equal the version of the data item in item collection 208. Replication update 216 may, for example, include a SQL update statement, a set statement, and so on. Any such statements may further be extended to include additional information for use with conflict resolution, such as a sequence indicator indicating when application update 206 was made.

Item collection 210 may process requests to update data items in item collection 210 by determining, for each update request, if the request conflicts with a previously processed request to update a version of the item stored in item collection 210. A variety of conflict resolution mechanisms may be employed. In some instances, application update 206 may take precedence over application update 218 if application update 206 occurred prior to application update 218. This "last write wins" approach may be appropriate in various scenarios, including those in which data is normally stored in a particular region but relocated on occasion to another region.

Figure 3:
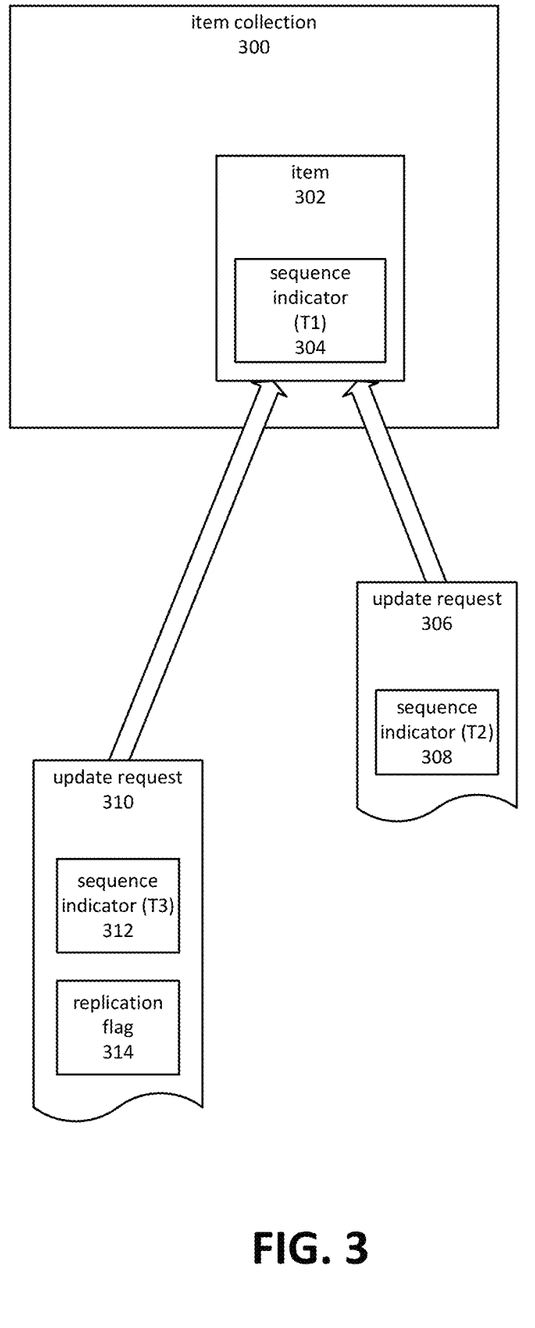
FIG. 3 is a block diagram depicting an example of a conflict resolution technique for application-based and replication-based updates.

FIG. 3 is a block diagram depicting an example of a conflict resolution technique for application-based and replication-based updates. An item collection 300 may be maintained on one or more computing nodes in a region. For the purposes of this example, item collection 300 may contain an item 302 that was inserted or last updated at time T1, as indicated by a sequence indicator 304 stored with item 302 in the item collection 300.

A request to update item 302 may be processed in item collection 300 by comprising the sequence indicator 304 associated with item 302, associated with T1 to the sequence indicator 308 associated with application update request 306. If update request 306 was issued at a later time than T1, the value or values specified in update request 306 might be applied to item 302. In addition, sequence indicator 304 could then be modified to indicate that its last update time was T2, as specified by sequence indicator 308 in update request 306.

A second request to update item 302 might be update request 310, issued at the time T3 recorded in a sequence indicator 312. If the time T3 associated with update request 310 is subsequent to the time T2 associated with update request 306 and stored in item 302 (after update request 306 was processed), then the update request 310 may be applied to item 302 to update it.

The computing nodes maintaining item collection 300 may apply the conflict resolution mechanism depicted in FIG. 3 to all updates, including those coming from applications as well as from replication. In some instances, however, the conflict resolution rule depicted in FIG. 3, as well as FIG. 4, which will be discussed in paragraphs to follow, may be applied when resolving conflicts involving replication and not when resolving conflicts that involve only application-based updates. The computing nodes maintaining item collection 300 may identify the source of an update—such as whether it is a replication-issued update or an application-issued update—by examining the presence or absence of a replication flag 314, which may be included in an update request, such as update request 310.

Figure 4:
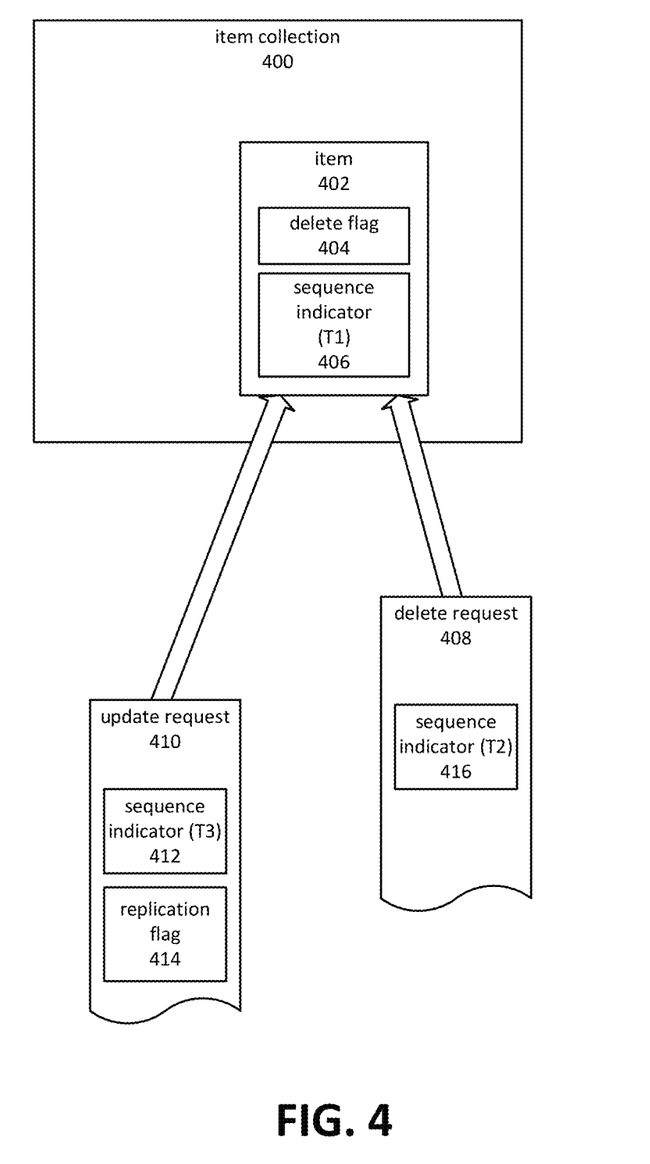
FIG. 4 is a block diagram depicting an example of a conflict resolution technique for changes to an item collection that includes deletions.

FIG. 4 is a block diagram depicting an example of a conflict resolution technique for changes to an item collection that includes deletions. An item collection 400 may be maintained on one or more computing nodes in a region. For the purposes of this example, item collection 400 may contain an item 402 that was inserted or last updated at time T1, as indicated by a sequence indicator 406 stored with item 402 in the item collection 400.

The one or more computing nodes that maintain item collection 400 may process a delete request 408 at a time T2, as indicated by a sequence indicator 416 included in the delete request. In some instances, for deletes and other operations, time may be determined by alternate methods, such as the time at which the one or more computing nodes maintaining item collection 400 receives a request.

The one or more computing nodes maintaining item collection 400 may process the delete by locating item 402 and modifying it with an indication that it has been deleted. This indication is represented in FIG. 4 by delete flag 404. The delete flag 404 may be a memory location having stored within it a Boolean value that, when set, indicates that the record is in a deleted state. A sequence indicator 406 is also updated in item 402 to indicate the time of deletion, using the time T2 supplied by sequence indicator 416 in delete request 408.

A subsequent update request 410 may be associated with a later time T3, as indicated by a sequence indicator 412 included in update request 410. The update request 410 may also include a replication flag 414, which can indicate whether or not update request 410 was issued to replicate a version of item 402 in another region to the region in which item collection 400 resides. As with updates and other requests to modify item collection 400, alternative conflict resolution techniques may be applied.

The conflict between delete request 408 and update request 410 may be resolved based on which request was issued last, with the later request taking precedence over the earlier request. If time T3 is assumed, for the purposes of this example, to be later than time T2, the delete flag 404 may be cleared to restore item 402 to an undeleted state, and update request 410 can be applied to item 402.

Figure 5:
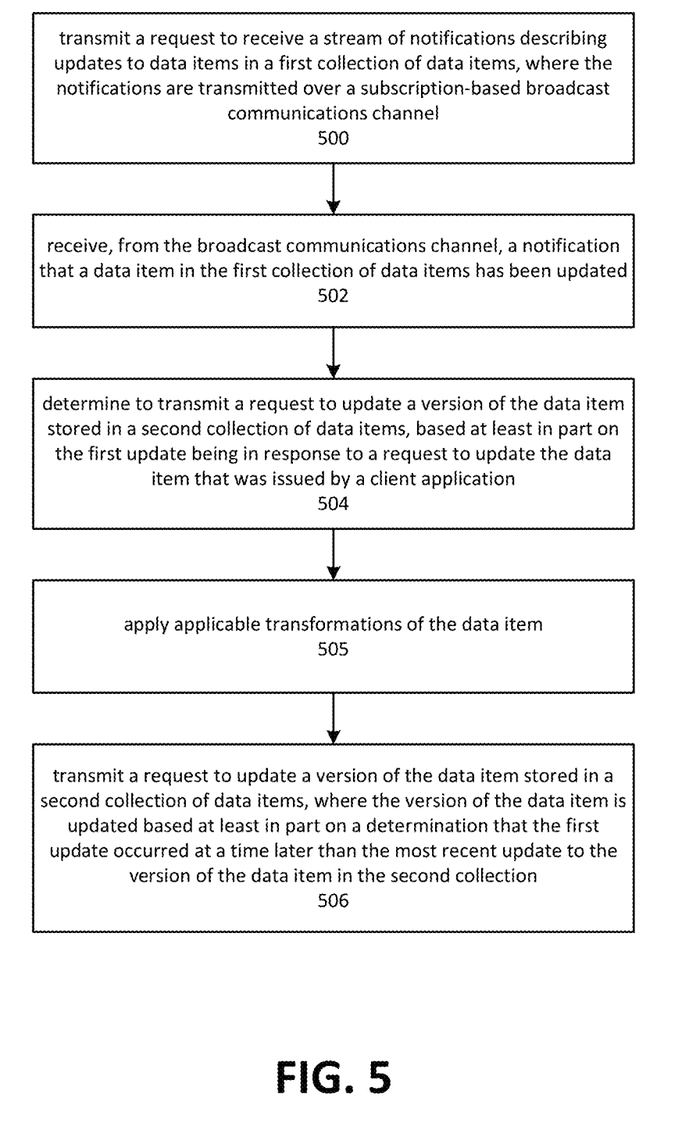
FIG. 5 is a flow diagram depicting an example of synchronizing data item collections maintained in separate regions.

FIG. 5 is a flow diagram depicting an example of synchronizing data item collections maintained in separate regions. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

At block 500, an embodiment may transmit a request to receive a stream of notifications that describe updates to data items maintained in a first collection of data items. The first collection of data items may be maintained by one or more computing nodes operating in a first region. For example, a distributed key-value database management system may maintain the collection of data items. The notifications are transmitted over a broadcast communications channel. The broadcast communications channel may operate on a publish and subscribe model, in which a publisher transmits notifications over the channel to a receiver, but is not necessarily aware of the presence of the receiver. This approach allows a client-based replication architecture, in which a client of a collection of data items, for example a client of a distributed key-value pair database, may control the replication of data items between collections of data items.

At block 502, an embodiment may receive, from the broadcast communications channel, a notification that a data item in the first collection of data items has been updated. A process operating within a region may monitor the first collection in order to determine when an insert, update, or delete operation has occurred. Notifications of these changes may be transmitted over the broadcast communications channel to any subscribers. In some cases, the monitoring process may be a part of a database engine or other component. In other cases, the monitoring process may be separate from the database engine or other component that maintains the collection of data items, but may receive or obtain notifications of changes to a collection. Monitoring of the collection map can comprise these and other mechanisms or techniques for determining if the item collection has changed. Typically, monitoring of the collection may be done through a notification mechanism integrated into the database engine or other component of the process that maintains the collection of data items.

At block 504, an embodiment may determine to transmit a request to update a version of the updated data item that resides in another collection of items, such as a collection maintained in another region. The determination may be based in part on the update to the data item having originated by a client application, rather than by the replication process. This approach prevents update requests issued for the purpose of replication from being re-replicated. Embodiments may include data in the notifications sent over the broadcast communications channel that indicates whether the notification is associated with a client application's update request or is associated with replication.

At block 505, the embodiment may, if applicable, apply transformations to the updated data item. A transformation may be applied, for example, to change the format of the data item to one used by the second collection of data items, in cases where the second collection stored data in a different format than the first collection. Note that the operations depicted in block 505 may be combined with other operations, such as formulating the request to update the version of the data item in the second collection, as described in block 506.

At block 506, embodiments may transmit a request to update a version of the data item stored in a second collection of data items. The second collection of data items may be maintained in a second region by one or more computing nodes, typically but not necessarily in a similar configuration as is used with the first collection of data items. The request to update the version of the data item in the second collection is updated in accordance with the conflict resolution mechanisms described herein. The update may be processed by applying the update if it was issued at a time later than the time at which the version of the data item in the second collection was inserted or last modified. The request to update the version of the data item in the second collection may include instructions for implementing the policy. For example, the policy can comprise SQL statements that cause the version of the data item in the second collection to be updated when the first update occurred at a time later than a most recent update time of the version of the data item.

In some instances, conflicts may be detected or resolved using conflict detection policies other than a last-write wins policy. The policy may be defined in or referenced by the request. For example, the request to update the data item in the second collection might include SQL statements that indicate how a conflict is to be detected and how it is to be resolved. The SQL statement might, for example, include an "update" statement that is restricted by a "where" clause that causes the update to be applied only under the conditions specified by the "where" clause. In some instances, conflict resolution may be deferred or may involve user participation. The embodiment may employ mechanisms to retry requests to update the data in the second collection. This may apply to cases where a conflict existed as well as to cases where the update failed for some other reason.

Figure 6:
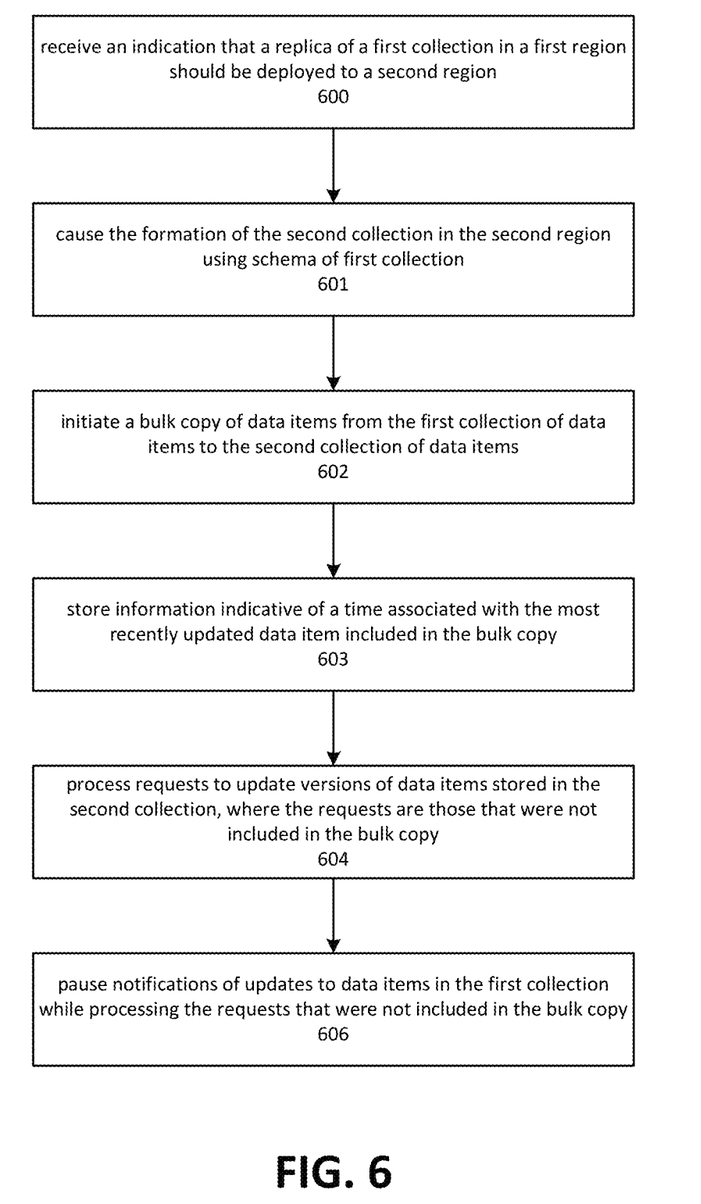
FIG. 6 is a flow diagram depicting an example of initiating replication between two collections of data items.

FIG. 6 is a flow diagram depicting an example of initiating replication between two collections of data items. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein. In some instances, embodiments of the process depicted in FIG. 6 may be performed by a coordinator module, such as the coordinator module 108 depicted in FIG. 1. The process may be performed in conjunction with the initial establishment of replication between two collections of data items.

At block 600, an embodiment may receive an indication that a replica of a first collection maintained in a first region should be deployed to a second region. In some cases, the indication may be in response to a user selection of the second region as a destination for replication.

At block 601, the embodiment may cause the formation of the second collection in the second region. The second collection may be initialized in an empty state, which is to say that initially, no data items are stored in it. The second collection may be formed using the schema of the first collection. Because the first collection has schema associated with it that can be used to form the collection, a request to initiate replication to another region does not need to be accompanied by detailed schema information. Forming a collection may comprise creating structures, such as tables, indexes, constraints, and so forth, on a database system that will maintain the collection.

At block 602, the embodiment may initiate a bulk copy of data items from the first collection of data items to the second collection of data items. The term bulk copy may refer to forming copies of a relatively large number of data items in the second collection, based on corresponding data items in the first collection. In general, bulk copy operations may be relatively lengthy due to the amount of data that is typically transferred.

At block 603, the embodiment may store information that is indicative of the time at which the most recently updated data item included in the bulk copy was modified. Update requests initiated after commencement of the bulk copy may be handled separately. The information indicative of the time may be a sequence indicator such as a timestamp or a monotonically increasing value.

Block 604 depicts processing requests to update versions of the data items that were subsequent to the most recently updated version of a data item included in the bulk copy. This may be done by comparing the sequence indicator or sequence number associated with the most recently updated data item included in the bulk copy to a sequence indicator associated with a request to update the data item.

At block 606, the embodiment may optionally pause notifications of updates to data items in the first collection while the backlog of requests—those referred to in block 604—are processed. Once the backlog has been processed, notifications may resume. This approach helps to prevent or reduce the likelihood that the broadcast communications channel may become overloaded with unprocessed requests. Accordingly, an embodiment of the replication process may cause the broadcast communications channel to pause, or in other words temporarily suspend, transmission of update notifications to replication module 116.

A coordinator module, such as the coordinator module 108 depicted in FIG. 1, may coordinate creation of the second collection in the second region, progress of the bulk copy, monitoring of notifications awaiting processing in the broadcast communications channel, and so on.

Figure 7:
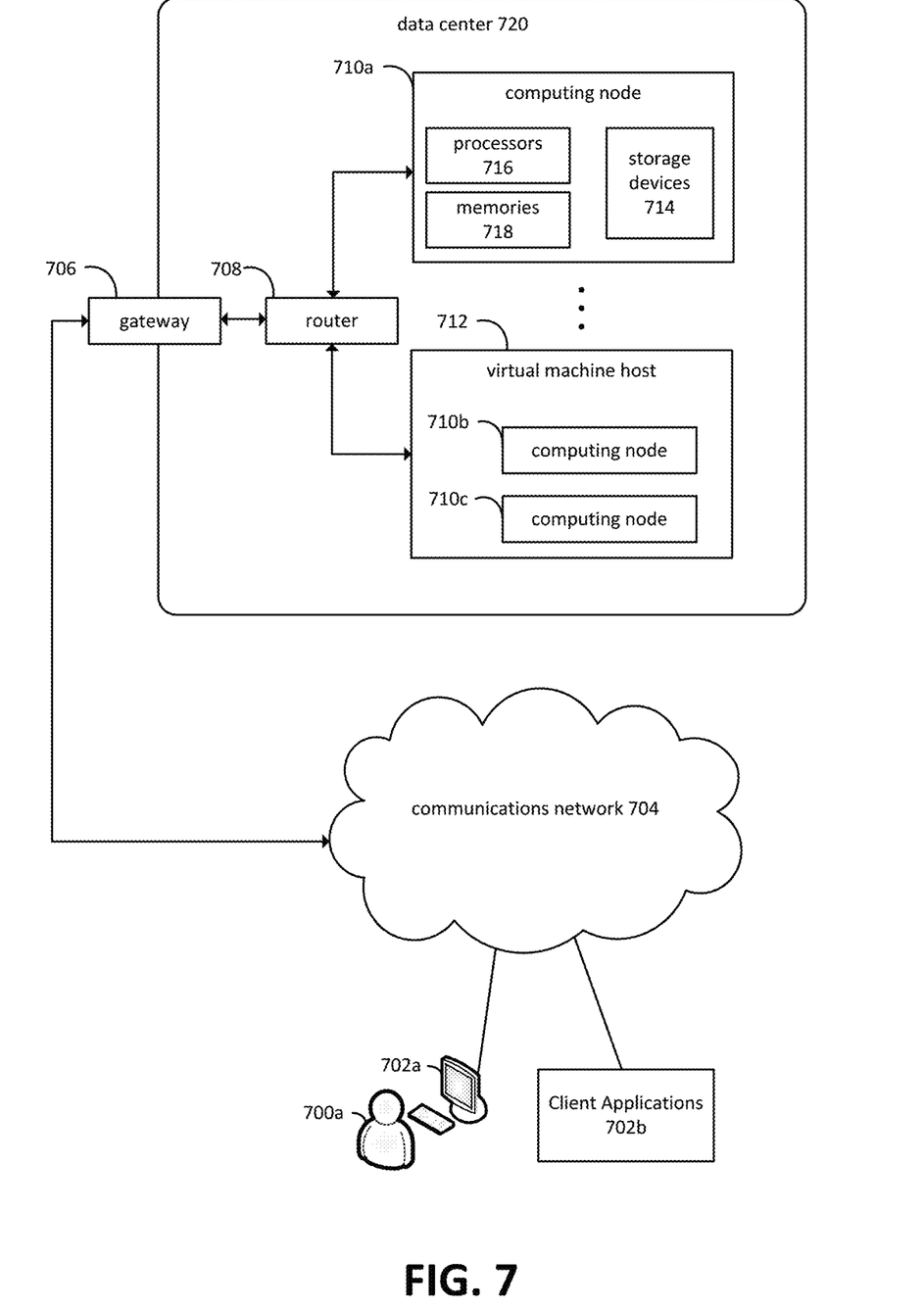
FIG. 7 is a block diagram depicting an embodiment of a computing environment in which aspects of the present disclosure may be practiced.

FIG. 7 is a diagram depicting an example of a distributed computing environment on which aspects of the present invention may be practiced. Various users 700a may interact with various client applications, operating on any type of computing device 702a, to communicate over communications network 704 with processes executing on various computing nodes 710a, 710b, and 710c within a data center 720. Alternatively, client applications 702b may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 710a, 710b, and 710c, operating within data center 720, may be provided via gateway 706 and router 708. Numerous other network configurations may also be employed. Although not explicitly depicted in FIG. 7, various authentication mechanisms, web service layers, business objects, or other intermediate layers may be provided to mediate communication with the processes executing on computing nodes 710a, 710b, and 710c. Some of these intermediate layers may themselves comprise processes executing on one or more of the computing nodes. Computing nodes 710a, 710b, and 710c, and processes executing thereon, may also communicate with each other via router 708. Alternatively, separate communication paths may be employed. In some embodiments, data center 720 may be configured to communicate with additional data centers, such that the computing nodes and processes executing thereon may communicate with computing nodes and processes operating within other data centers.

Computing node 710a is depicted as residing on physical hardware comprising one or more processors 716, one or more memories 718, and one or more storage devices 714. Processes on computing node 710a may execute in conjunction with an operating system or alternatively may execute as a bare-metal process that directly interacts with physical resources, such as processors 716, memories 718, or storage devices 714.

Computing nodes 710b and 710c are depicted as operating on virtual machine host 712, which may provide shared access to various physical resources, such as physical processors, memory, and storage devices. Any number of virtualization mechanisms might be employed to host the computing nodes.

The various computing nodes depicted in FIG. 7 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 8:
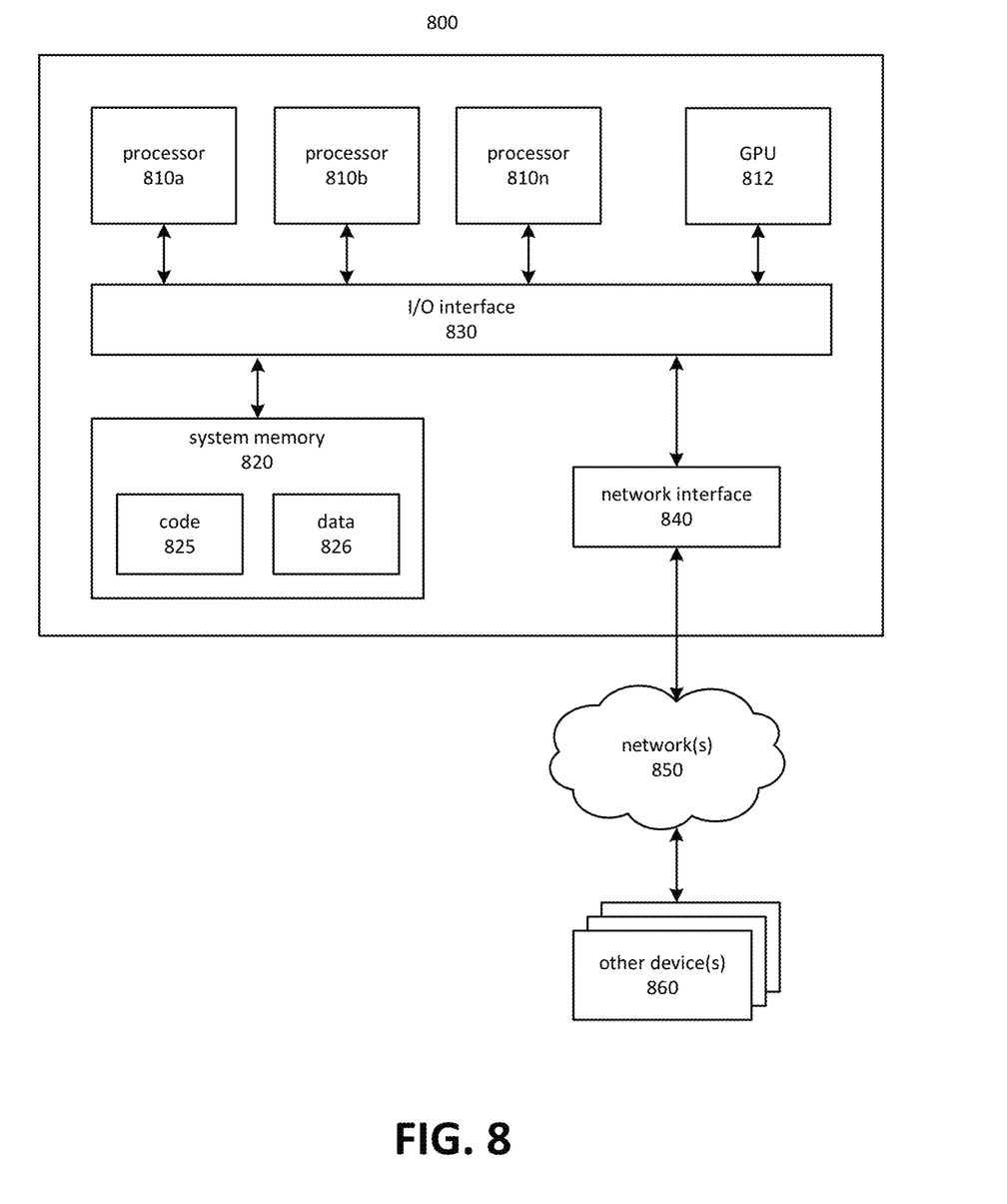
FIG. 8 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b, and/or 810n (which may be referred herein singularly as a processor 810 or in the plural as the processors 810) coupled to a system memory 820 via an input/output ("I/O") interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures ("ISAs"), such as the x86, PowerPC, SPARC or MIPS ISAs, or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals, such as electrical, electromagnetic or digital signals, conveyed via a communication medium, such as a network and/or a wireless link, such as those that may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   a first one or more computing nodes that, as result of processing a first update of a data item stored in a first collection of data items, transmits information indicative of the first update over a broadcast communications channel, wherein the information indicative of the first update is transmitted based at least in part on determining that the update originated from a client request to update the data item in the first collection of data items;
   a second one or more computing nodes that, as a result of being activated, maintains a second collection of data configured as an at least partial replica of the first collection; and
   one or more memories comprising computer-executable instructions that, as a result of execution, cause the system at least to:
      receive the information indicative of the first update from the broadcast communications channel; and
      transmit a request to update the data item in the second collection, the request comprising the information indicative of the first update and a sequence indicator, wherein the request comprises a flag indicative of the request being associated with replication of the updated data item, wherein the second one or more computing nodes determines to process the first update in response to a determination that the first update does not conflict with a prior update to the data item, the determination based at least in part on the sequence indicator being indicative of the first update occurring after the prior update, wherein the system determines to not transmit the request to update the data item in the second collection over the broadcast communications channel, based at least in part on the flag, in the request, that indicates the request is associated with replication of the data item.

2. The system of claim 1, further comprising one or more memories comprising computer-readable instructions that, as a result of execution by the one or more computing devices, cause the system at least to:
   transmit a request for a subscription to information transmitted on the broadcast communications channel; and
   receive the information indicative of the first update based at least in part on the subscription.

3. The system of claim 1, wherein the first one or more computing nodes, as a result of receiving a request to delete an additional data item, updates the additional data item to comprise information indicative of a deleted state.

4. The system of claim 1, wherein the request to update the data item in the second collection comprises the flag indicative of the request having been originated by the system.

5. The system of claim 4, further comprising one or more memories comprising computer-readable instructions that, as a result of execution by the one or more computing devices, cause the system at least to:
  determine to not transmit the information indicative of the request to update the data item in the second collection on the broadcast communications channel based at least in part on the flag; and
  determine to transmit information indicative of an additional request to update an additional item in the second collection based at least in part on determining that the flag is not set in the additional request.

6. A computer-implemented method, comprising:
  receiving, from a broadcast communications channel, information indicative of a first update to a data item stored in a first collection of data items, wherein the information indicative of the first update was broadcast based at least in part on determining that the update originated from a client request to update the data item;
  transmitting a request to update a version of the data item stored in a second collection of data items, wherein the request comprises a flag indicative of the request being associated with replication of the data item, wherein the version of the data item is updated based at least in part on a determination that the first update does not conflict with a prior update of the version of the data item in the second collection, wherein the determination is based at least in part on a conflict detection policy indicated by the request; and
  determining to not transmit the received request over the broadcast communications channel, based at least in part on the flag, in the request, that indicates the request is associated with replication of the data item.

7. The computer-implemented method of claim 6, further comprising:
  transmitting a request for a subscription to information transmitted on the broadcast communications channel; and
  receiving the information indicative of the first update based at least in part on the subscription.

8. The computer-implemented method of claim 6, further comprising:
  updating the first data item to comprise information indicative of a deleted state in response to a request to delete the data item.

9. The computer-implemented method of claim 6, wherein the request associated with replication is sent in response to another request initiated by a client.

10. The computer-implemented method of claim 6, further comprising:
  receiving a request to replicate the first collection of items to a second region;
  forming the second collection based at least in part on schema of the first collection;
  performing a bulk copy of data items from the first collection of items to the second collection of data items;
  storing information indicative of a time associated with a most recently updated data item included in the bulk copy; and
  processing a plurality of requests to update versions of the data items stored in the second collection, the plurality of requests associated with updates to data items in the first collection processed after the time associated with a most recently updated data item included in the bulk copy.

11. The computer-implemented method of claim 10, wherein the bulk copy is performed in response to determining that a capacity of the broadcast communications channel would be exceeded.

12. The computer-implemented method of claim 6, further comprising:
  delaying the receiving of the information indicative of a first update, wherein the delaying is based at least in part on supporting a rollback operation.

13. The computer-implemented method of claim 6, further comprising:
  maintaining a coordinator process operating in a first region, the first region comprising one or more computing nodes maintaining the first collection; and
  monitoring, by the coordinator process, updates to the first collection that have not been replicated to the second collection.

14. A non-transitory computer-readable storage medium having stored thereon instructions that, as a result of execution by one or more computing devices, cause the one or more computing devices at least to:
  transmit a request to receive a stream of information indicative of updates to data items in a first collection of data items, the information to be transmitted over a broadcast communications channel;
  receive, from the broadcast communications channel, information indicative of a first update to a data item stored in the first collection of data items;
  determine that the first update was in response to a request to update the data item issued by a client; and
  transmit a request to update a version of the data item stored in a second collection of data items, wherein the request comprises a flag indicative of the request being associated with replication, wherein the version of the data item is updated based at least in part on a determination that the first update does not conflict with a prior update of the version of the data item in the second collection, wherein the determination is based at least in part on a policy indicated by the request, and wherein it is determined to not transmit the request over the broadcast communications channel, based at least in part on the flag, in the request, that indicates the request is associated with replication.

15. The non-transitory computer-readable storage medium of claim 14, comprising further instructions that, as a result of execution by the one or more computing devices, cause the one or more computing devices to at least:
  transmit a request for a subscription to information transmitted on the broadcast communications channel; and
  receive the information indicative of the first update based at least in part on the subscription.

16. The non-transitory computer-readable storage medium of claim 14, comprising further instructions that, as a result of execution by the one or more computing devices, cause the one or more computing devices to at least:
  update the first data item to comprise information indicative of a deleted state in response to a request to delete the data item.

17. The non-transitory computer-readable storage medium of claim 14, comprising further instructions that, as a result of execution by the one or more computing devices, cause the one or more computing devices to at least:
perform a bulk copy of data items from the first collection of data items to the second collection of data items;
store information indicative of a time associated with a most recently updated data item included in the bulk copy; and
process a plurality of requests to update versions of the data items stored in the second collection, the plurality of requests associated with updates to data items in the first collection of data items processed after the time associated with a most recently updated data item included in the bulk copy.

18. The non-transitory computer-readable storage medium of claim 14, comprising further instructions that, as a result of execution by the one or more computing devices, cause the one or more computing devices to at least:
maintain a coordinator process operating in a first region, the first region comprising one or more computing nodes maintaining the first collection of data items; and
monitor, by the coordinator process, updates to the first collection of data items that have not been replicated to the second collection of data items.

19. The non-transitory computer-readable storage medium of claim 14, wherein the policy comprises instructions that cause the version of the data item in the second collection to be updated when the first update occurred at a time later than a most recent update time of the version of the data item.

20. The non-transitory computer-readable storage medium of claim 14, wherein the version of the data item stored in the second collection is a transformed version of the data item.

* * * * *